US006193946B1

(12) United States Patent
Kawano et al.

(10) Patent No.: US 6,193,946 B1
(45) Date of Patent: Feb. 27, 2001

(54) PROCESS FOR THE PREPARATION OF A LITHIUM COMPOSITE METAL OXIDE

(75) Inventors: Tomoko Kawano, Osaka; Shigeo Kobayashi, Kyoto; Shoichiro Watanabe, Nara; Takafumi Fujiwara, Osaka; Akira Hashimoto, Osaka; Yasuhiko Syoji, Osaka, all of (JP)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 09/254,091

(22) PCT Filed: Jun. 30, 1998

(86) PCT No.: PCT/JP98/02955

§ 371 Date: Mar. 1, 1999

§ 102(e) Date: Mar. 1, 1999

(87) PCT Pub. No.: WO99/01903

PCT Pub. Date: Jan. 14, 1999

(30) Foreign Application Priority Data

Jul. 1, 1997 (JP) .................................................. 9-175451

(51) Int. Cl.$^7$ .......................... C01G 53/00; C01G 45/00; C01D 15/00; C01F 7/00
(52) U.S. Cl. ........................... 423/594; 423/599; 423/600
(58) Field of Search ..................................... 423/594, 599, 423/600, 179.5; 429/223, 224, 231.1, 231.3, 218.1, 231.95

(56) References Cited

U.S. PATENT DOCUMENTS

| | | | |
|---|---|---|---|
| 5,264,201 | * 11/1993 | Dahn et al. | 423/594 |
| 5,700,442 | * 12/1997 | Bloch et al. | 423/599 |
| 5,879,654 | * 3/1999 | Van Ghemen et al. | 423/599 |
| 5,891,416 | * 4/1999 | Yamazaki et al. | 423/594 |
| 5,961,949 | * 10/1999 | Manev et al. | 423/599 |

FOREIGN PATENT DOCUMENTS

| | | |
|---|---|---|
| 5-290832 | 11/1993 | (JP) . |
| 6-342657 | 12/1994 | (JP) . |
| 7-230808 | 8/1995 | (JP) . |
| 8-138672 | 5/1996 | (JP) . |
| 8-153513 | 6/1996 | (JP) . |
| 8-185861 | 7/1996 | (JP) . |
| 10-27613 | 1/1998 | (JP) . |

OTHER PUBLICATIONS

Search report corresponding to application No. PCT/JP98/02955 dated Aug. 18, 1998.

* cited by examiner

*Primary Examiner*—Steven Bos
(74) *Attorney, Agent, or Firm*—Ratner & Prestia

(57) ABSTRACT

Lithium composite metal oxides prepared by mixing at least one type of hydroxides, oxides, and carbonates of a metal selected from the group of transition metal, IIA metal, and IIIA metal, and a lithium compound of which the D50 value is in the range 5 to 50 $\mu$m, the D90 value is 90 $\mu$m or smaller, and in which particles 100 $\mu$m or greater do not exist, and calcining in the temperature range 700 to 1000° C. for 2 to 30 hours, and grinding, are used as the active material of a positive electrode which is laminated with a negative electrode with a separator interposed and spirally wound thereby forming an electrode group. By using the positive active materials prepared in this manner, discharge capacity and cycle characteristic of a non-aqueous electrolyte secondary cell can be improved.

36 Claims, 1 Drawing Sheet

PROCESS FOR THE PREPARATION OF A LITHIUM COMPOSITE METAL OXIDE

This application is a U.S. National Phase Application of PCT International Application PCT/JP98/02955.

FIELD OF THE INVENTION

The present invention relates to non-aqueous electrolyte secondary cells and a manufacturing process of positive materials to for use in the cells.

BACKGROUND OF THE INVENTION

In recent years, active research and development are being conducted on lithium cells, especially rechargeable lithium secondary cells, as a new type of secondary cells with a high voltage and a high energy density. In the early stage of its initial research, great expectation was placed as a high energy-density cell on lithium secondary cells that employed metallic lithium in the negative electrode. However, when metallic lithium is used in the negative electrode, dendritic lithium (dendrite) produced during charge grows with charge and discharge of the cell and eventually causes problems such as internal short-circuit of the cell or even abnormal temperature rise of the cell. In an effort to help solve these problems, trials have been made to use alloys with lithium of low-melting metals such as aluminum, lead, indium, bismuth, cadmium, etc., in the negative electrode rather than using metallic lithium alone. However, as the charge and discharge proceed, the alloys become fine particles and penetrate through the separator, eventually causing internal short-circuit. Lithium secondary cells were thus difficult to commercialize.

Consequently, lithium secondary cells that employ carbon in the negative electrode and lithiated transition metal compound in the positive are becoming the mainstream. In these cell systems, as the charge and discharge are performed by the intercalation and de-intercalation of lithium ions in the carbon of the negative electrode, dendrites will not grow during charge, and cells with a good cycle characteristic and superior safety have become available.

In recent years, with the rapid advance in portable or cordless electronic equipment and information equipment, there is a high demand primarily for small-size, light-weight, yet high energy-density secondary cells as the power supply for these equipment. In light of this demand, non-aqueous electrolyte secondary cells, especially lithium secondary cells, are drawing attention as a cell having a high voltage and high energy density.

As the positive active materials in the conventional lithium secondary cells, $LiCoO_2$, $LiNiO_2$, $LiMn_2O_4$, etc., are known. Cells employing $LiCoO_2$ as the positive active material have already been commercialized. Also, since $LiNiO_2$ as a positive active material provides lower cost and higher capacity than $LiCoO_2$, it is an object of active research and development.

As an example, Japanese Laid-Open Patent No. Hei 8-138672 discloses a technology of manufacturing $LiNiO_2$ as a positive active material in which a lithium hydroxide and a nickel salt are mixed in ethanol, dried, and pelletized, followed by temporal calcination at a temperature in the range 350 to 500° C., and heating at a temperature in the range 750 to 850° C.

Also, in U.S. Pat. No. 5,264,201 and in Japanese Laid-Open Patent No. Hei 6-342657, a method of synthesizing a lithium composite nickel-transition metal oxide is disclosed in which a mixture of a nickel oxide and nickel hydroxide or oxide or hydroxide of any one of Fe, Co, Cr, Ti, Mn, and V is used as the raw material, and the mixture and a lithium hydroxide are then mixed and heat treated at a temperature of 600° C. or higher.

Also, in Japanese Laid-Open Patent No. Hei 8-185861, a technology of manufacturing $LiNiO_2$ is disclosed in which a lithium compound and a nickel compound are mixed and calcinated at a temperature in the range 600 to 900° C., and then calcinated at a temperature in the range 400 to 700° C.

Furthermore, in Japanese Laid-Open Patent No. Hei 8-153513, a method of synthesizing a positive active material is disclosed in which a lithium compound and a metal salt, metal oxide or metal hydroxide are mixed and heat treated at a temperature in the range 600 to 1100° C.

As the conventional process of manufacturing positive active materials for non-aqueous electrolyte secondary cells is based on a technology of synthesizing a lithium composite metal oxide using a lithium compound, when the particle size of the lithium compound used as the main material is large, for instance, lithium compound particles with a D50 value greater than 50 μm, or a D90 value greater than 90 μm, or with a particle size 100 μm or greater exist, the contact area between the lithium compound and the mixed metal carbonates, metal oxides, or metal hydroxides becomes small. As a result, it suffered a problem of segregation of a lithium salt within the obtained positive active material, causing insufficient synthesizing reaction and lowering the capacity per unit weight of the active material. Here, D50 and D90 values represent particle sizes at which cumulative volume of particles smaller than the designated size reach 50% and 90%, respectively.

Also, because of segregation of lithium within the positive active material, a lithium composite metal oxide is locally synthesized in which lithium content is smaller than the stoichiometric composition. The locally produced lithium composite metal oxide undergoes destruction of layer structure of crystals with repetition of charge and discharge, thus presenting a problem of obstructing diffusion of lithium ions and lowering charge-discharge cycle characteristic of a non-aqueous electrolyte secondary cell.

With a view to solving this problem, a method of synthesizing a positive active material has been proposed (for instance in Japanese Laid-Open Patent No. Hei 8-138672) in which the raw materials are made to come into full contact with each other by mixing a lithium compound and other raw materials in a solvent such as ethanol and making a slurry. However, as this process of manufacturing a positive active material mixes raw materials in a solvent it suffers a problem of requiring additional processes such as drying and pelletizing, thus increasing the number of synthesizing processes.

DISCLOSURE OF THE INVENTION

In order to address the above-described problems, in using lithium composite metal oxides represented by the chemical formula $LiMO_2$ ($0.50 \leq x \leq 1.10$, M being one or more types of transition metal, IIA metal, or IIIA metal) as a positive active material of a non-aqueous electrolyte secondary cell, the present invention uses at least one from the group consisting of metal hydroxides represented by the chemical formula $M_y(OH)_2$ ($0.6 \leq y \leq 1$, M being one or more types of transition metal, IIA metal or IRA metal), metal oxides represented by the chemical formula $M_yO$ ($0.6 \leq y \leq 1$, M being one or more types of transition metal, IIA metal, or IIIA metal), and metal carbonates as represented by the chemical formula $M_yCO_3$ ($0.6 < y \leq 1$, M being one or more types of transition metal, IIA metal or IIIA metal), and a lithium compound which has a D50 value in the range 5 to 50 μm, a D90 value 90 μm or smaller, and in which particles 100 μm or greater in particle size do not exist is mixed, calcined, and subsequently ground.

As a result, the discharge capacity per unit weight of the active material in the positive active material is increased and the cycle characteristic is improved. The structure of the present invention is described in the following in further detail.

The present invention is to prepare a positive active material by mixing at least one type of a hydroxide, an oxide or a carbonate of at least one type of metal selected from the group consisting of transition metal, IIA metal, and IIIA metal, and a lithium compound which has a D50 value in the range 5 to 50 μm, a D90 value 90 μm or smaller, and which does not contain particles 100 μm or greater in particle size, and subsequently calcinating preferably at a temperature in the range 700 to 1000° C. preferably for 2 to 30 hours, and then grinding.

Furthermore, a lithium composite metal oxide represented by the chemical formula $Li_xMO_2$ ($0.50 \leq x \leq 1.10$, M being one or more types of transition metal, IIA metal, or IIIA metal) is used as the positive active material.

The present invention further uses a metal hydroxide represented by the chemical formula $M_y(OH)_2$ ($0.6 \leq y < 1$, M being one or more types of transition metal, IIA metal or IIIA metal), a metal oxide represented by the chemical formula $M_yO$ ($0.6 \leq y \leq 1$, M being one or more types of transition metal, IIA metal, or IIIA metal), and a metal carbonate represented by the chemical formula $M_yCO_3$ ($0.6 \leq y \leq 1$, M being one or more types of transition metal, IIA metal or IIIA metal).

As the lithium compound, one or more types of lithium hydroxides, lithium carbonates, and lithium nitrates are preferable.

The configurations of the particles of the metal hydroxides, metal oxides, and metal carbonates are preferably such that spherical or elliptic spherical secondary particles have been formed.

The preferable metal hydroxides include cobalt hydroxides or nickel hydroxides either alone or in mixture; hydroxides containing cobalt and nickel; manganese hydroxides alone; a mixture of cobalt hydroxides, nickel hydroxides, and manganese hydroxides; hydroxides containing cobalt, nickel, and manganese; aluminum hydroxides alone; a mixture of cobalt hydroxides, nickel hydroxides, and aluminum hydroxides; hydroxides containing cobalt, nickel, and aluminum; heat-treated cobalt hydroxides or heat-treated nickel hydroxides alone, or heat-treated mixture of them; heat-treated hydroxides containing cobalt and nickel; cobalt carbonates or nickel carbonates alone or heat-treated mixture of them; and heat-treated carbonates containing cobalt and nickel.

The preferable lithium composite metal oxides $Li_xMO_2$ include $LiCoO_2$, $LiNiO_2$, $LiNi_{1-x}Co_xO_2$, $LiNi_{1-x-y}Co_xMn_yO_2$, $LiNi_{1-x-y}Co_xAl_yO_2$, $LiNi_{1-x}Mn_xO_2$, $LiNi_{1-x}Al_xO_2$, $LiMnO_2$, and $LiMn_2O_4$ ($x<1$, $y<1$, $x+y<1$).

When preparing lithium composite metal oxides, if the D50 value of a lithium compound is greater than 50 μm, or the D90 value is greater than 90 μm, or particles 100 μm or greater in particle size exist, the contact area between the lithium compound and metal carbonates, metal oxides or metal hydroxides becomes small, and lithium salts segregate within the active material, thus obstructing progress of synthesizing reaction and lowering capacity per unit weight of the active material. Furthermore, by segregation of lithium within the active material, a lithium composite metal oxide is locally produced in which the quantity of lithium is smaller than the stoichiometric composition, and layer structure of the crystals is destroyed by repetition of charge and discharge, thus obstructing diffusion of lithium ions and lowering cycle characteristic.

Also, if the D50-value of the lithium compound is smaller than 5 μm, the fluidity of powder worsens and raw materials are not fully dispersed during stirring and mixing, thus creating a cause for segregation of lithium salts within the active material, and fine particles get into the air while stirring and mixing, thus making handling difficult. Therefore, it is preferable that the D50 value of the lithium compound as a raw material is in the range 5 to 50 μm, more preferably in the range 5 to 30 μm.

Generally, a lithium hydroxide can be obtained as a lithium hydroxide hydrate by producing a white precipitate as a result of reaction between either a lithium carbonate and a calcium hydroxide, or a lithium sulfate and a barium hydroxide. As the D50 value of the lithium hydroxide hydrate prepared in this manner is 100 μm or greater, when the lithium hydroxide hydrate is used for preparation of a lithium composite metal oxide as it is, the discharge capacity and cycle life decrease for the above-described reason.

Consequently, in the preparation of a lithium composite metal oxide, it is preferable to make the lithium hydroxide hydrate in a state, through grinding and sieving processes, in which the D50 and D90 values are within the range 5 to 50 μm, and 90 μm or smaller, respectively, and particles 100 μm or greater in particle size do not exist. It is most preferable that the D50 value is in the range 5 to 30 μm, the D90 value is 60 μm or smaller, and that particles 90 μm or larger do not exist.

Though a lithium hydroxide can be obtained by heating and dehydrating a lithium hydroxide hydrate, as the obtained product is easy to hydrate and change weight, storage management becomes difficult. It is therefore preferable to use a lithium hydroxide prepared by the above-described process.

Also, though a lithium carbonate can be synthesized by extraction from ore or recovery from brine, mass produced one is mostly synthesized from ore by sulfuric acid method.

A lithium carbonate is obtained by adding sulfuric acid and heating after roasting and grinding ore, followed by extraction with water to obtain a lithium sulfate. The lithium sulfate is then made to react with soda lime, and a lithium carbonate is obtained as a white precipitate. As the D50 value of the lithium carbonate prepared in this manner is generally in the range 20 to 30 μm, it can be used as it is and an enough effect is obtained. However, further enhanced effect may be obtained by making the lithium carbonate in a state, through additional processes of grinding and sieving, in which the D50 value is in the range 5 to 15 μm, the D90 value is 50 μm or smaller, and particles 100 μm or greater do not exist.

In the preparation of the positive active material described in the foregoing, either when the calcining temperature is less than 700° C. or when the calcinating time is less than 2 hours, insufficient synthesizing reaction of the lithium composite metal oxide is caused leaving some part unreacted, thus lowering the capacity per unit weight. Also, as insufficient crystallization of the lithium composite metal oxide is caused, layer structure of crystals is destroyed through repetition of charge and discharge, obstructing diffusion of lithium ions and resulting in a decrease in the discharge capacity.

Also, either when the calcining temperature is higher than 1000° C. or when the calcining time is longer than 30 hours, a structure is formed in which lithium has entered into the metal section of the lithium composite metal oxide and metal has entered into the lithium section, and the crystal structure is changed from a hexagonal structure to a rock-salt structure, thus obstructing diffusion of lithium ions during charge and discharge and resulting in a decrease in the discharge capacity.

Consequently, the temperature range 700 to 1000° C. is especially preferable as the calcining-temperature, and the range 2 to 30 hours is especially preferable as the calcining time.

Especially when those in which spherical or elliptic spherical secondary particles have been formed are used as the metal hydroxides, metal oxides, or metal carbonates, the contact area with the lithium compound becomes large, synthesizing reaction proceeds well, and a sufficient discharge capacity is obtained.

The present invention relates to a manufacturing process of positive active materials and does not suffer from the limitations of the negative electrode; however, when carbon is used in the negative electrode as described in the exemplary embodiments, a non-aqueous secondary cell having a high energy density, various superior characteristics, and a high safety level can be made. Moreover, graphite is preferable as it gives a high voltage.

Also, there being no limitation on the type of non-aqueous electrolytes in the present invention, a non-aqueous liquid electrolyte, solid electrolyte, or both may be used. In the case of a liquid electrolyte, it comprises a solvent and a lithium salt dissolved in the solvent. As examples of the non-aqueous solvents, aprotic organic solvents including cyclic carbonates such as ethylene carbonate (EC), propylene carbonate (PC), butylene carbonate (BC), acyclic carbonates such as dimethyl carbonate (DMC), diethyl carbonate (DEC), ethylmethyl carbonate (EMC), aliphatic carboxylic esters such as methyl formate, methyl acetate, methyl propionate, ethyl propionate, γ-lactones such as γ-butyrolactone, chain structure ethers such as 1,2-dimethoxyethane (DME), 1,2-diethoxyethane (DEE), ethoxymethoxyethane (EME), cyclic ethers such as tetrahydrofuran, 2-methyltetrahydrofuran, can be used. One or more of these may be used alone or in mixture.

In the case of a cell using carbon in the negative electrode as described in the exemplary embodiments, a mixture of cyclic carbonates and acyclic carbonates, or a mixture of cyclic carbonates, acyclic carbonates and aliphatic carboxylic esters is preferable.

Examples of the lithium salts to be dissolved in these solvents include $LiClO_4$, $LiBF_4$, $LiPF_6$, $LiCF_3SO_3$, $LiCF_3CO_2$, $Li(CF_3SO_2)_2$, $LiAsF_6$, $LiN(CF_3SO_2)_2$. While one or more of these may be used in the liquid electrolyte alone or in combination, inclusion of $LIPF_6$ is especially preferable.

In addition to liquid electrolytes, the following solid electrolytes may be used at the same time. Solid electrolytes can be divided into inorganic solid electrolytes and organic solid electrolytes. As the inorganic solid electrolytes, nitrides, halogenides, and oxyacid salts, of Li are well known. Among them, $Li_3N$, $LiI$, $Li_5Ni_2$, $Li3N$-$LiI$-$LiOH$, $Li_4SiO_4$, $Li_4SiO_4$-$LiI$-$LiOH$, $xLi_3PO_4$-$(1-x)Li_4SiO_4$, $L_2SiS_3$, and phosphorous sulfide compounds are effective.

As examples of the organic solid electrolytes, high-polymer matrix materials such as polyethylene oxide, polypropylene oxide, polyphosfazen, polyaziridine, polyethylene sulfide, polyvinyl alcohol, polyvinylidene fluoride, polyhexafluoropropylene, and their derivatives, mixtures, and composites are effective.

Among them, a copolymer of polyvinylidene fluoride and hexafluoropropylene, and a mixture of polyvinylidene fluoride and polyethylene oxide are preferable.

DESCRIPTION OF THE PREFERRED EMBODIMENTS

Figure 1:
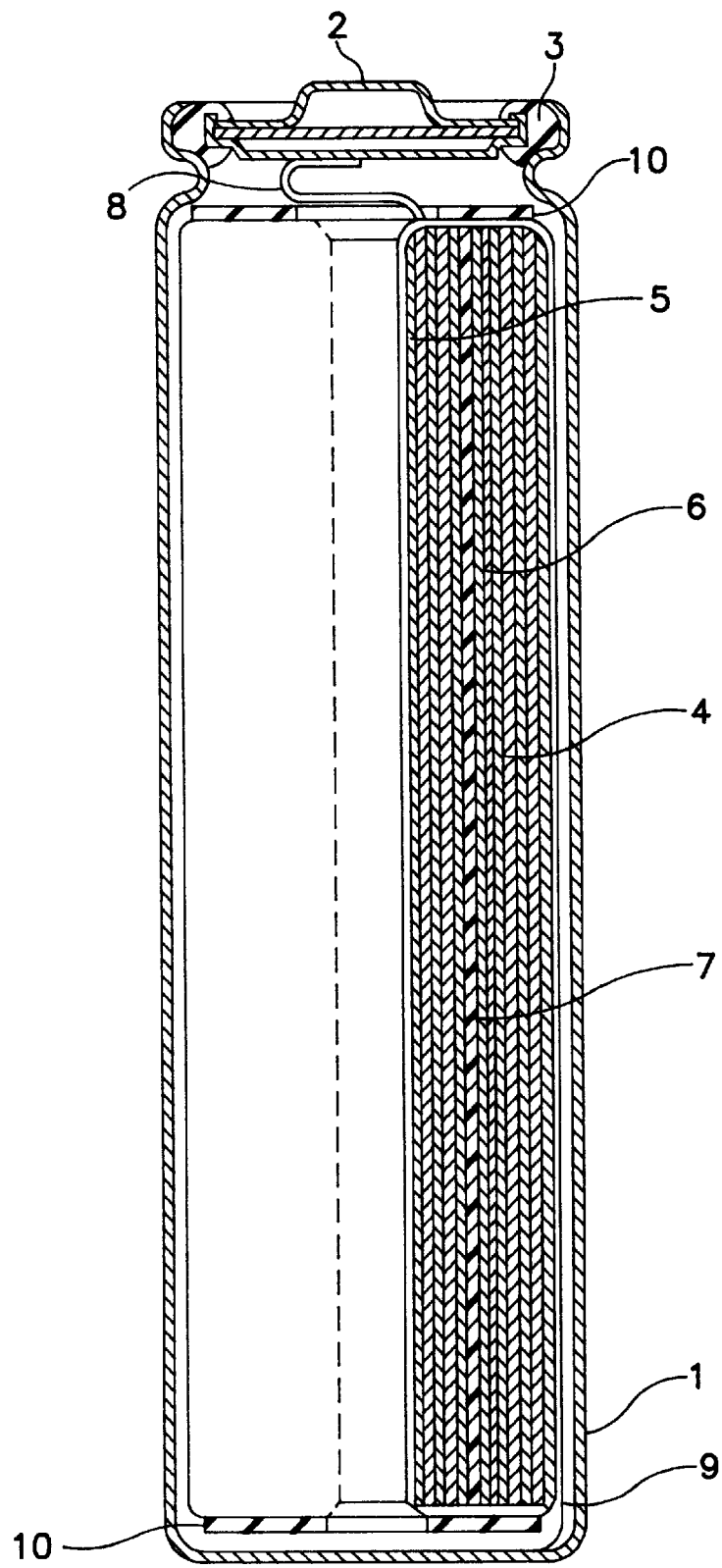
FIG. 1 is a cross-sectional view of a cylindrical lithium secondary cell using a positive active material obtained by an exemplary embodiment of the present invention.

Exemplary embodiments of the present invention are described in the following. FIG. 1 is a cross-sectional view of a cylindrical lithium secondary cell employing a positive active material obtained by the exemplary embodiments. In the drawing, numeral 1 is an organic-liquid-electrolyte-resistant cell case made of stainless steel, numeral 2 is a seal plate provided with a safety vent, numeral 3 is an insulating packing, numeral 4 is an electrode group housed in the cell case 1 formed by laminating and spirally winding several times a positive electrode 5 and a negative electrode 6 with a separator 7 interposed. Numeral 8 is a positive electrode lead drawn from the positive electrode 5 and connected to the seal plate 2. Numeral 9 is a negative electrode lead drawn from the negative electrode 6 and connected to the bottom of the cell case 1, and numeral 10 are insulating rings provided on the top and bottom sections of the electrode group 4.

The positive electrode 5 is formed as described in the following. Three parts by weight of acetylene black is mixed with 100 pats by weight of lithium composite metal oxide as the positive active material, and an N-methylpyrrolidinone solution dissolving 4 parts by weight of polyvinylidene fluoride is added to the mixture as a binder, and a paste-like material is made by kneading. An electrode, 0.130 mm thick, 35 mm wide, and 270 mm long, is obtained by coating the paste-like kneaded material on both sides of a 0.020 mm thick aluminum foil, drying and then rolling.

The negative electrode 6 is formed using the so-called mesophase graphite obtained by graphitizing mesophase globules in the manner described in the following. Three parts by weight of styrene-butadiene rubber as a binder is mixed to 100 parts by weight of mesohpase graphite, and a paste-like material is obtained by adding an aqueous solution of carboxymethyl cellulose and kneading. An electrode, 0.20 mm thick, 37 mm wide, 280 mm long, is obtained by coating the kneaded paste-like material on both sides of a copper foil, drying and then rolling.

Subsequently, a positive electrode lead 8 made of aluminum and a negative electrode lead 9 made of nickel are attached to the positive electrode 5 and negative electrode 6, respectively. The positive electrode 5 and negative electrode 6 are laminated with a separator 7, 0.025 mm thick, 45 mm wide, 740 mm long, made of polyethylene interposed, and spirally wound to make the electrode group 4, and are housed in the cell case 1, 13.8 mm in diameter and 50 mm in height.

An electrolyte prepared by dissolving 1 mol/l lithium hexafluorophosphate in a mixture of ethylene carbonate and ethylmethyl carbonate at a volume ratio of 20:80 is poured into the electrode group 4.

The manufacturing process of the lithium composite metal oxide to be used as the positive active material of the positive electrode 5 is next described.

A nickel sulfate-cobalt sulfate mixed solution is prepared by dissolving nickel sulfate and cobalt sulfate at a molar ratio of Co to Ni of 20%. By adding a solution of sodium hydroxide to the nickel sulfate-cobalt sulfate mixed solution, a nickel-cobalt hydroxide is obtained by co-precipitation. By washing the obtained nickel-cobalt hydroxide in water and drying at 80° C., it becomes powdery and a nickel-cobalt hydroxide, $Ni_{0.8}Co_{0.2}(OH)_2$, in which secondary particles similar to spherical or elliptic spherical particles in shape have been formed is obtained.

By mixing the nickel-cobalt hydroxide thus obtained with a lithium hydroxide hydrate of which the D50 value is 30 $\mu$m, the D90 value is 50 $\mu$m, and in which particles 100 $\mu$m or greater in particle size do not exist at a molar ratio of Li/(Ni+Co) of 1/1, calcining at a temperature of 700° C. in an oxidizing atmosphere for 20 hours, and then grinding, $LiNi_{0.8}Co_{0.2}O_2$ is obtained. The average particle size and size distribution are measured by a laser type particle size distribution measuring instrument (Holiba LA-910) using isopropyl alcohol as the dispersion medium.

The composite metal oxide ($LiNi_{0.8}Co_{0.2}O_2$) prepared in this manner is designated as Example 1 in Table 1.

Examples 2 and 3 in Table 1 are prepared by changing the average particle size and size distribution of the lithium hydroxide hydrate to be mixed in Example 1 to a D50 value of 50 $\mu$m, a D90 value of 88 $\mu$m, and to a D50 value of 5 $\mu$m, a D90 value of 20 $\mu$m, respectively.

Also, Examples 4 to 7 in Table 1 are prepared by changing the calcining temperature of Example 1 to 600° C., 900° C., 1000° C., and 1050° C., respectively.

Examples 8 to 11 in Table 1 are prepared by changing the calcining time of Example 1 to 1 hour, 2 hours, 30 hours, 40 hours, respectively.

Using the positive active materials of Examples 1 to 11, cylindrical lithium secondary cells illustrated in FIG. 1 are made, the evaluated cell characteristics of which being as shown in Table 1.

By mixing the nickel-cobalt hydroxide, $Ni0.8Co_{0.2}(OH)_2$, prepared in the same manner as the Example 1 into a lithium hydroxide hydrate of which the D50 value is 60 $\mu$m, the D90 value is 88 $\mu$m, and in which particles 100 $\mu$m or greater in particle size do not exist at a molar ratio of Li/(Ni+Co) of 1/1, and calcining at a temperature of 700° C. in an oxidizing atmosphere for 20 hours and then grinding, $LiNi_{0.8}Co_{0.2}O_2$ is obtained, which is designated as Comparative Example 1 in Table 1.

Comparative Example 2 in Table 1 is made by using a lithium hydroxide hydrate of which the D50 value is 50 $\mu$m, the D90 value is 98 $\mu$m, and in which particles 100 $\mu$m or greater in particle size do not exist in Example 1.

Comparative Example 3 in Table 1 is made by using a lithium hydroxide hydrate of which the D50 value is 50 $\mu$m, the D90 value is 88 $\mu$m, and in which particles 100 $\mu$m or greater in particle size are 3 % in volume ratio of the total volume in Example 1.

Using the positive active materials of Comparative Examples 1 to 3, cylindrical lithium secondary cells similar to Examples are made, the evaluated cell characteristics of which being as shown in Table 1.

In evaluating the cell characteristics, charge-discharge tests were conducted under the following conditions. The cells were charged under a constant-current, constant-voltage mode of 4.2 volts for 2 hours, namely, charged at a constant current of 420 mA until the cell voltage reached 4.2 volts, and then a fixed limiting resistor was set to decay the current so that the cells are charged for a total of 2 hours under the condition of 4.2 volts being applied. Discharge was done at a constant current of 610 mA until an end-of-discharge voltage of 3.0 volts was reached. Charge and discharge under these conditions were made in an environment of 20° C. In making the cycle life test, the discharge capacity at the 5th cycle was defined as the initial capacity, while the number of cycles at which the discharge capacity had deteriorated to 300 mAh was defined as the end of the cycle life. Specific capacity of the active material was obtained by converting the discharge capacity at the 5th cycle to a value per unit weight of the active material, the results of which being as shown in Table 1.

It can be seen from Examples 1 to 3 that, when the D50 value of the lithium hydroxide hydrate is in the range 5 to 50 $\mu$m, both the specific capacity of the active material and cycle characteristic are approximately the same, and that the smaller the D50 value is, the higher the discharge capacity becomes.

TABLE 1

|  | LiOH.H$_2$O D$_{50}$ ($\mu$m) | LiOH.H$_2$O D$_{90}$ ($\mu$m) | Ratio of LiOH.H$_2$O 100 $\mu$m or greater in size (%) | Calcining temp. (° C.) | Calcining time (hr) | Discharge capacity of cell (mAh) | Specific capacity of active material (mAh/g) | No. of cycles at end of life |
|---|---|---|---|---|---|---|---|---|
| Example 1 | 30 | 50 | 0 | 700 | 20 | 787 | 175 | 630 |
| Example 2 | 50 | 88 | 0 | 700 | 20 | 774 | 172 | 618 |
| Example 3 | 5 | 20 | 0 | 700 | 20 | 801 | 178 | 649 |
| Example 4 | 30 | 50 | 0 | 600 | 20 | 752 | 167 | 383 |
| Example 5 | 30 | 50 | 0 | 900 | 20 | 783 | 174 | 620 |
| Example 6 | 30 | 50 | 0 | 1000 | 20 | 774 | 172 | 605 |
| Example 7 | 30 | 50 | 0 | 1050 | 20 | 733 | 163 | 480 |
| Example 8 | 30 | 50 | 0 | 700 | 1 | 743 | 165 | 374 |
| Example 9 | 30 | 50 | 0 | 700 | 2 | 778 | 173 | 610 |
| Example 10 | 30 | 50 | 0 | 700 | 30 | 770 | 171 | 628 |
| Example 11 | 30 | 50 | 0 | 700 | 40 | 725 | 161 | 488 |
| Comp. Exmpl. 1 | 60 | 88 | 0 | 700 | 20 | 738 | 164 | 302 |
| Comp. Exmpl. 2 | 50 | 98 | 0 | 700 | 20 | 725 | 161 | 294 |
| Comp. Exmpl. 3 | 50 | 88 | 3 | 700 | 20 | 742 | 165 | 322 |

It can also be seen from Example 2 and Comparative Examples 1 to 3 that, when the D50 value of the lithium hydroxide hydrate is greater than 50 $\mu$m, or even when the D50 value of the lithium hydroxide hydrate is 50 $\mu$m, if the D90 value is greater than 90 $\mu$m or particles 100 $\mu$m or greater in particle size exist, both specific capacity of the active material and cycle characteristic decrease. Here, the reason for the decrease of the capacity per unit weight of the active material is considered to be due to a reduction in the specific surface area of the lithium hydroxide hydrate, resulting in a decrease in the contact area between the lithium hydroxide hydrate and nickel-cobalt hydroxide and segregation of lithium salts within the active material, thus obstructing full synthesizing reaction. The reason for the lowered cycle characteristic is considered to be due to local production of a lithium composite metal oxide in which the quantity of lithium is less than the stoichiometric composition owing to the segregation of lithium which destroys the layer structure of the crystals through repeated charge and discharge.

Also, it can be seen from Example 1 and Examples 4 to 7 that, in the calcining temperature range 600 to 1050° C., the cycle characteristic is superior to that of Comparative Examples, and that the discharge capacity is approximately the same in the temperature range 700 to 1000° C.

It can also be seen from Examples 1, 4, and 8 that, either when the calcining temperature is lower than 700° C. or the calcining time is shorter than 2 hours, both discharge capacity and cycle characteristic have lowered though they are superior to those of Comparative Examples. Here, the reason for the decrease in the discharge capacity is considered to be due to insufficient synthesizing reaction of the lithium composite metal oxide, which has produced local unreacted sections thus lowering the capacity per unit weight of the active material. The reason for the decrease in the cycle characteristic is considered to be due to insufficient crystallization of the lithium composite metal oxide, which has caused destruction of the layer structure of the crystals through repetition of charge and discharge thus obstructing diffusion of lithium ions.

It is also seen from Examples 1, 7, and 11 that, when the calcining temperature is higher than 1000° C. or the calcining time is longer than 30 hours, both the specific capacity of the active material and the cycle characteristic decrease. However, the cycle characteristic is superior to that of Comparative Examples. Here, the decrease in the capacity per unit weight of the active material is considered to be due to a structure in which lithium has entered into the metal sections of the lithium composite metal oxide and metal has entered into the lithium sections, thus changing the crystal structure from a hexagonal structure to a rock-salt structure and obstructing diffusion of lithium ions during charge and discharge. The lowering of the cycle characteristic is considered to be due to a shorter time before reaching the end of the cycles (300 mAh) because of a low initial capacity.

From the above discussions, it is known that the preferable calcining temperature is in the range 700 to 1000° C. and that the preferable calcining time is in the range 2 to 30 hours.

Now, a nickel-cobalt hydroxide, Ni$_{0.8}$Co$_{0.2}$(OH)$_2$, prepared in the same manner as in Example 1 and a lithium hydroxide of which the D50 value is 30 $\mu$m the D90 value is 50 $\mu$m, and in which particles 100 $\mu$m or greater in particle size do not exist are mixed at a molar ratio of Li(Ni+Co) of 1/1, calcined in an oxidizing atmosphere for 20 hours, and ground to obtain LiNi0.8Co$_{0.2}$O$_2$. The lithium composite metal oxide thus prepared is Example 12 in Table 2.

Also, Example 13 in Table 2 is prepared by using a lithium carbonate of which the D50 value is 30 $\mu$m, the D90 value is 50 $\mu$m, and in which particles 100 $\mu$m or greater in particle size do not exist as the raw material in place of the lithium hydroxide to be added in Example 12.

Furthermore, Example 14 in Table 2 is prepared by using a lithium carbonate of which the D50 value is 5 $\mu$m, the D90 value is 30 $\mu$m, and in which particles 100 $\mu$m or greater in particle size do not exist as the raw material in place of the lithium hydroxide to be added in Example 12.

Subsequently, a mixed solution of nickel sulfate and cobalt sulfate is prepared by dissolving in water nickel sulfate and cobalt sulfate at a molar ratio of Co to Ni of 20%, and a solution of sodium carbonate is added to the mixed solution, and nickel-cobalt carbonate is obtained by co-precipitation. By washing the obtained nickel-cobalt carbonate in water and drying at 80° C. to make it powdery, a nickel-cobalt carbonate ($Ni_{0.8}Co_{0.2}CO_3$) in which secondary particles similar to spherical or elliptic spherical particles in shape have been formed is prepared. By mixing the nickel-cobalt carbonate thus prepared and a lithium hydroxide hydrate of which the D50 value is 30 $\mu$m, the D90 value is 50 $\mu$m, and in which particles 100 $\mu$m or greater in particle size do not exist at a molar ratio of Li/(Ni+Co) of 1/1, and calcining at a temperature of 700° C. in an oxidizing atmosphere for 20 hours and grinding, $LiNi_{0.8}Co_{0.22}$ is obtained. The lithium composite metal oxide prepared in this manner is Example 15 in Table 2.

Furthermore, a nickel-cobalt oxide ($Ni_{0.8}Co_{0.2}O$) is prepared by heating at a temperature of 500° C. a nickel-cobalt carbonate ($Ni_{0.8}Co_{0.2}CO_3$) prepared in the same manner as in Example 15. As the powder of this nickel-cobalt oxide has formed secondary particles similar to spherical or elliptic spherical particles in shape as in the case of the nickel-cobalt carbonate, the nickel-cobalt oxide and a lithium hydroxide hydrate of which the D50 value is 30 $\mu$m, the D90 value is 50 $\mu$m, and in which particles 100 $\mu$m or greater in particle size do not exist are mixed at a molar ratio of Li/(Ni+Co) of 1/1, calcined at a temperature of 700° C. for 20 hours and then ground to obtain $LiNi_{0.8}Co_{0.2}O_2$. The compound obtained through this process is Example 16 in Table 2.

Also, by heat-treating the nickel-cobalt hydroxide, $Ni_{0.8}Co_{0.2}(OH)_2$, prepared in the same manner as in Example 1, a nickel-cobalt oxide ($Ni_{0.8}Co_{0.2}O$) can be prepared. Powder of the nickel-cobalt oxide prepared in this manner has formed secondary particles similar to spherical or elliptic spherical particles in shape as is the case with the nickel-cobalt hydroxide. By mixing this nickel-cobalt oxide and a lithium hydroxide hydrate of which the D50 value is 30 $\mu$m, the D90 value is 50 $\mu$m, and in which particles 100 $\mu$m or greater in particle size do not exist at a molar ratio of Li/(Ni+Co) of 1/1, calcinating at a temperature of 700° C. in an oxidizing atmosphere for 20 hours, and then grinding, $LiNi_{0.8}Co_{0.2}O_2$ is prepared. The lithium composite metal oxide prepared in this manner is Example 17 in Table 2.

Using the positive active materials in Examples 12 to 17, cylindrical lithium secondary cells having a structure illustrated in FIG. 1 are made, the evaluated cell performance of which being as shown in Table 2.

As is evident from Table 2, it can be seen that both specific capacity of the active material and cycle characteristic are approximately the same despite the difference in the type of lithium compound and metal compound used as the raw materials of the lithium composite metal oxide.

From the above, it is known that, when the D50 value is 50 $\mu$m or smaller, the D90 value is 90 $\mu$m or smaller and particles 100 $\mu$m or greater in particle size do not exist in a lithium compound, an active material having a high discharge capacity and withstanding charge and discharge cycles can be produced irrespective of the type of raw materials used.

Also, from Examples 13 and 14, it is known that when the raw material is a lithium carbonate, if the D50 value is in the range 5 to 30 $\mu$m, the D90 value is 50 $\mu$m or smaller, and particles 100 $\mu$m or greater in particle size do not exist, better results may be obtained.

TABLE 2

| | Type of Li cmpd | Type of metal cmpd | Raw material of metal oxide | $D_{50}$ of Li source ($\mu$m) | $D_{90}$ of Li source ($\mu$m) | Ratio of Li source 100 $\mu$m or greater (%) | Discharge capacity of cell (mAh) | Specific capacity of active material (mAh/g) | No. of cycles at end of life |
|---|---|---|---|---|---|---|---|---|---|
| Ex. 12 | Li hydrox. | Hydroxide | — | 30 | 50 | 0 | 787 | 175 | 628 |
| Ex. 13 | Li carbon. | Hydroxide | — | 30 | 50 | 0 | 778 | 173 | 622 |
| Ex. 14 | Li carbon. | Hydroxide | — | 5 | 30 | 0 | 801 | 178 | 639 |
| Ex. 15 | Li hydrox. hydrate | Carbonate | — | 30 | 50 | 0 | 774 | 172 | 606 |
| Ex. 16 | Li hydrox hydrate | Oxide | Carbonate | 30 | 50 | 0 | 797 | 177 | 632 |
| Ex. 17 | Li hydrox hydrate | Oxide | Hydroxide | 30 | 50 | 0 | 792 | 176 | 626 |

By mixing metal hydroxides prepared in the same manner as in Example 1 by changing the type of metal and ratio of the metal sulfates with a lithium hydroxide hydrate of which the D50 value is 30 $\mu$m, the D90 value is 50 $\mu$m, and in which particles 100 $\mu$m and greater in particle size do not exist at a molar ratio of Li/M (M being one or more metals selected from the group of Ni, Co, Mn, and Al) of 1/1, calcining at a temperature of 700° C. in an oxidizing atmosphere for 20 hours, and then grinding, a lithium composite metal oxide $LiMO_2$ (M being one or more metals selected from the group of Ni, Co, Mn, and Al) is prepared. Lithium composite metal oxides prepared in this manner are Examples 18 to 26 in Table 3.

Using the positive active materials in Examples 18 to 26, cylindrical lithium secondary cells having a structure illustrated in FIG. 1 are made, and the results of evaluation of their cell characteristics are shown in Table $_3$.

TABLE 3

|  | Molar ratio of Ni to metals other than Li in active material (%) | Molar ratio of Co to metals other than Li in active material (%) | Molar ratio of Mn to metals other than Li in active material (%) | Molar ratio of Al to metals other than Li in active material (%) | $D_{50}$ of LiOH. $H_2O$ ($\mu$m) | $D_{90}$ of LiOH. $H_2O$ ($\mu$m) | Ratio of LiOH.$H_2O$ 100 $\mu$m or greater (%) | Discharge capacity of cell (mAh) | Specif. capacity of active material (mAh/g) | No. of cycles at end of life |
|---|---|---|---|---|---|---|---|---|---|---|
| Ex. 18 | 100 | 0 | 0 | 0 | 30 | 50 | 0 | 801 | 178 | 602 |
| Ex. 19 | 80 | 20 | 0 | 0 | 30 | 50 | 0 | 787 | 175 | 633 |
| Ex. 20 | 50 | 50 | 0 | 0 | 30 | 50 | 0 | 778 | 173 | 628 |
| Ex. 21 | 20 | 80 | 0 | 0 | 30 | 50 | 0 | 770 | 171 | 642 |
| Ex. 22 | 0 | 100 | 0 | 0 | 30 | 50 | 0 | 765 | 170 | 646 |
| Ex. 23 | 90 | 0 | 10 | 0 | 30 | 50 | 0 | 774 | 172 | 610 |
| Ex. 24 | 90 | 0 | 0 | 10 | 30 | 50 | 0 | 783 | 174 | 608 |
| Ex. 25 | 70 | 20 | 10 | 0 | 30 | 50 | 0 | 770 | 171 | 621 |
| Ex. 26 | 70 | 20 | 0 | 10 | 30 | 50 | 0 | 765 | 170 | 616 |

As is evident from Table 3, even when the type of metal or metal content of the metal hydroxides used as the raw materials of the lithium composite metal oxides is different, both the specific capacity of the active material and the cycle characteristic are approximately the same.

Consequently, when the lithium compound used as the raw material has a D50 value in the range 5 to 50 $\mu$m, a D90 value of 90 $\mu$m or smaller, and no particles 100 $\mu$m or greater in particle size, it is possible to produce a positive active material with a high discharge capacity and which withstands charge-discharge cycles irrespective of the type of raw materials.

Furthermore, by mixing at least two types of compounds selected from the group of nickel hydroxides, cobalt hydroxides, manganese hydroxides, and aluminum hydroxides, in which secondary particles similar to spherical or elliptic spherical particles in shape have been formed, and a lithium hydroxide hydrate of which the D50 value is 30 $\mu$m, the D 90 value is 50 $\mu$m, and in which particles 100 $\mu$m or greater do not exist at a molar ratio of Li/M (M being two or more metals selected from the group of Ni, Co, Mn, and Al) of 1/1, and calcining at a temperature of 700° C. in an oxidizing atmosphere for 20 hours, and then grinding, a lithium composite metal oxide $LiMO_2$ (M being two or more metals selected from the group of Ni, Co, Mn, and Al) is prepared. The lithium composite metal oxides prepared in this manner are Examples 27 to 33 in Table 4.

Using the positive active materials of Examples 27 to 33, cylindrical lithium secondary cells having a structure illustrated in FIG. 1 are made, the evaluated cell characteristics of which being as shown in Table 4.

As is evident from Table 4, even when lithium composite metal oxides are prepared by mixing metal hydroxides of different types of metals, both the specific capacity of the active material and cycle characteristic are approximately the same. Also, as the cell performance is not affected even when the molar ratio of Ni is made to 50% or greater, expensive Co may be saved.

Consequently, if a lithium compound has a D50 value in the range 5 to 50 $\mu$m, a D90 value of 90 $\mu$m or smaller, and no particles 100 $\mu$m or greater in particle size, it is possible to produce a positive active material with a high discharge capacity and which withstands charge and discharge cycles irrespective of the type of raw materials.

From the above discussions, it is possible to provide lithium secondary cells which are non-aqueous electrolyte secondary cells having a superior discharge capacity and a superior cycle characteristic by using in the preparation of the positive active material a metal carbonate, a metal oxide, or a metal hydroxide, and a lithium compound of which the D50 value is in the range 5 to 50 $\mu$m, the D90 value is 90 $\mu$m or smaller, and in which particles 100 $\mu$m or greater in particle size do not exist as the raw materials of the positive active material.

TABLE 4

|  | Molar ratio of Ni to metals other than Li in active material (%) | Molar ratio of Co to metals other than Li in active material (%) | Molar ratio of Mn to metals other than Li in active material (%) | Molar ratio of Al to metals other than Li in active material (%) | $D_{50}$ of LiOH. $H_2O$ ($\mu$m) | $D_{90}$ of LiOH. $H_2O$ ($\mu$m) | Ratio of LiOH.$H_2O$ 100 $\mu$m or greater (%) | Discharge Capacity of cell (mAh) | Specif. capacity of active material (mAh/g) | No. of cycles at end of life |
|---|---|---|---|---|---|---|---|---|---|---|
| Ex. 27 | 80 | 20 | 0 | 0 | 30 | 50 | 0 | 778 | 173 | 602 |
| Ex. 28 | 50 | 50 | 0 | 0 | 30 | 50 | 0 | 770 | 171 | 618 |
| Ex. 29 | 20 | 80 | 0 | 0 | 30 | 50 | 0 | 756 | 168 | 624 |
| Ex. 30 | 90 | 0 | 10 | 0 | 30 | 50 | 0 | 765 | 170 | 600 |
| Ex. 31 | 90 | 0 | 0 | 10 | 30 | 50 | 0 | 765 | 170 | 596 |

TABLE 4-continued

| | Molar ratio of Ni to metals other than Li in active material (%) | Molar ratio of Co to metals other than Li in active material (%) | Molar ratio of Mn to metals other than Li in active material (%) | Molar ratio of Al to metals other than Li in active material (%) | $D_{50}$ of LiOH.$H_2O$ ($\mu$m) | $D_{90}$ of LiOH.$H_2O$ ($\mu$m) | Ratio of LiOH.$H_2O$ 100 $\mu$m or greater (%) | Discharge Capacity of cell (mAh) | Specif. capacity of active material (mAh/g) | No. of cycles at end of life |
|---|---|---|---|---|---|---|---|---|---|---|
| Ex. 32 | 70 | 20 | 10 | 0 | 30 | 50 | 0 | 760 | 169 | 594 |
| Ex. 33 | 70 | 20 | 0 | 10 | 30 | 50 | 0 | 756 | 168 | 602 |

The present invention is not limited to the examples that have been described in the foregoing. As the lithium composite metal oxides, although description has been made on the cases of $LiCoO_2$, $LiNiO_2$, $LiNi_{1-x}Co_xO_2$, $LiNi_{1-x-y}Co_xMn_yO_2$, $LiNi_{1-x-y}Co_xAl_yO_2$, $LiNi_{1-x}Mn_xO_2$, and $LiNi_{1-x}Al_xO_2$, similar effects may be obtained by the use of lithium composite metal oxides represented by the chemical formula $Li_xMO_2$ ($0.50 \leq x \leq 1.10$, M being one or more types of transition metal, IIA metal or IIIA metal).

As the metal hydroxides to be used as a raw material of the lithium composite metal oxides, those represented by the chemical formula $M_y(OH)_2$ ($0.6 \leq y \leq 1$, M being one or more types of transition metal, IIA metal or IIIA metal); as the metal oxides, those represented by the chemical formula $M_yO$ ($0.6 \leq y \leq 1$, M being one or more types of transition metal, IIA metal or IRA metal); and as the metal carbonates, those represented by the chemical formula $M_yCO_3$ ($0.6 \leq y \leq 1$, M being one or more types of transition metal, IIA metal or IIIA metal), are respectively effective.

In the above examples, although evaluation was made using cylindrical lithium secondary cells, similar effect may be obtained in other cell configurations including prismatic cells.

INDUSTRIAL APPLICATIONS

The present invention is practiced as has been described in the foregoing exemplary embodiments and can improve discharge capacity and cycle characteristic of non-aqueous electrolyte secondary cells by making contact area among raw materials large and suppressing segregation of lithium salts which tends to occur during synthesis by using as the positive active material a lithium composite metal oxide prepared by using at least one type of metal carbonates, metal oxides, or metal hydroxides, and a lithium compound of which the D50 value is in the range 5 to 50 $\mu$m, the D90 value is 90 $\mu$m or smaller, and in which particles 100 $\mu$m or greater in particle size do not exist.

What is claimed is:

1. A manufacturing process for a lithium composite metal oxide useful as a positive active material for nonaqueous electrolyte secondary cells, the process comprising:
   mixing a precipitate of a carbonate, an oxide, or a hydroxide with a lithium compound;
   calcining the precipitate and the lithium compound to form the lithium composite metal oxide; and
   grinding the lithium composite metal oxide;
   wherein:
   the precipitate comprises nickel and at least one metal selected from the group consisting of cobalt, manganese, and aluminum; and
   the lithium compound has a D50 value in the range of 5 to 50 $\mu$m, a D90 value of 90 $\mu$m or smaller, and no particles 100 $\mu$m or greater in particle size.

2. The process of claim 1 in which the precipitate is a hydroxide formed by co-precipitation of the nickel and the at least one metal with sodium hydroxide.

3. The process of claim 1 in which the precipitate is a carbonate formed by co-precipitation of the nickel and the at least one metal with sodium carbonate.

4. The process of claim 1 in which calcining is carried out at 700 to 1000° C. for 2 to 30 hours.

5. The process of claim 1 in which the lithium compound is lithium hydroxide, lithium hydroxide hydrate, or lithium carbonate.

6. The process of claim 5 in which the lithium compound is lithium carbonate, the D50 value is in the range of 5 to 15 $\mu$m, and the D90 value is 50 $\mu$m or smaller.

7. The process of claim 5 in which the lithium compound is lithium hydroxide hydrate, the D50 value is in the range of 5 to 30 $\mu$m, the D90 value is 60 $\mu$m or smaller, and there are no particles 90 $\mu$m or greater in particle size.

8. The process of claim 1 in which the D50 value is 5 to 30 $\mu$m.

9. The process of claim 1 in which the precipitate is a powder in which the particles are spherical or elliptic spherical in shape.

10. The process of claim 1 in which the at least one metal is cobalt.

11. The process of claim 1 in which the at least one metal is manganese.

12. The process of claim 1 in which the at least one metal is aluminum.

13. The process of claim 1 in which the at least one metal is cobalt and manganese.

14. The process of claim 1 in which the at least one metal is cobalt and aluminum.

15. The process of claim 1 in which the molar ratio of nickel in the precipitate is 50% or greater.

16. The process of claim 15 in which the precipitate is a hydroxide formed by co-precipitation of the nickel and the at least one metal with sodium hydroxide.

17. The process of claim 15 in which precipitate is a carbonate formed by co-precipitation of the nickel and the at least one metal with sodium carbonate.

18. The process of claim 15 in which calcining is carried out at 700 to 1000° C. for 2 to 30 hours.

19. The process of claim 15 in which the lithium compound is lithium hydroxide, lithium hydroxide hydrate, or lithium carbonate.

20. The process of claim 19 in which the lithium compound is lithium carbonate, the D50 value is in the range of 5 to 15 µm, and the D90 value is 50 µm or smaller.

21. The process of claim 19 in which the lithium compound is lithium hydroxide hydrate, the D50 value is in the range of 5 to 30 µm, the D90 value is 60 µm or smaller, and there are no particles 90 µm or greater in particle size.

22. The process of claim 15 in which the D50 value is 5 to 30 µm.

23. The process of claim 15 in which the precipitate is a powder in which the particles are spherical or elliptic spherical in shape.

24. The process of claim 15 in which the at least one metal is cobalt.

25. The process of claim 24 in which precipitate is a powder in which the particles are spherical or elliptic spherical in shape.

26. The process of claim 15 in which the at least one metal is manganese.

27. The process of claim 26 in which the precipitate is a powder in which the particles are spherical or elliptic spherical in shape.

28. The process of claim 15 in which the at least one metal is aluminum.

29. The process of claim 28 in which the precipitate is a powder in which the particles are spherical or elliptic spherical in shape.

30. The process of claim 15 in which the at least one metal is cobalt and manganese.

31. The process of claim 30 in which the precipitate is a powder in which the particles are spherical or elliptic spherical in shape.

32. The process of claim 15 in which the at least one metal is cobalt and aluminum.

33. The process of claim 32 in which the precipitate is a powder in which the particles are spherical or elliptic spherical in shape.

34. The process of claim 15 in which the lithium composite metal oxide is selected from the group consisting of $LiNi_{1-x}Co_xO_2$, $LiNi_{1-x-y}Co_xMn_yO_2$, $LiNi_{1-x-y}Co_xAl_yO_2$, $LiNi_{1-x}Mn_xO_2$, and $LiNi_{1-x}Al_xO_2$ in which x<1, y<1, and x+y<1.

35. The process of claim 1 in which the lithium composite metal oxide is selected from the group consisting of $LiNi_{1-x}Co_xO_2$, $LiNi_{1-x-y}Co_xMn_yO2$, $LiNi_{1-x-y}Co_xAl_yO_2$, $LiNi_{1-x}Mn_xO_2$, and $LiNi_{1-x}Al_xO_2$ in which x<1, y<1, and x+y<1.

36. The method of claim 1 in which the precipitate is nickel-cobalt hydroxide and the molar ratio Li/(Ni+Co) is 1 to 1.

* * * * *

UNITED STATES PATENT AND TRADEMARK OFFICE
CERTIFICATE OF CORRECTION

PATENT NO. : 6,193,946 B1
DATED : February 27, 2001
INVENTOR(S) : Kawano et al.

Page 1 of 1

It is certified that error appears in the above-identified patent and that said Letters Patent is hereby corrected as shown below:

Title page,
Item [57] ABSTRACT, line 7, "calcining" should read -- calcinating --.

Column 18,
Line 22, "$LiNi_{1-x-y}Co_xMn_yO2$" should read -- $LiNi_{1-x-y}CO_xMn_yO_2$ --.

Signed and Sealed this

Twelfth Day of March, 2002

Attest:

JAMES E. ROGAN
*Attesting Officer*   *Director of the United States Patent and Trademark Office*